(No Model.)
I. L. WAGNER.
WAGON BRAKE.
No. 602,786. Patented Apr. 19, 1898.
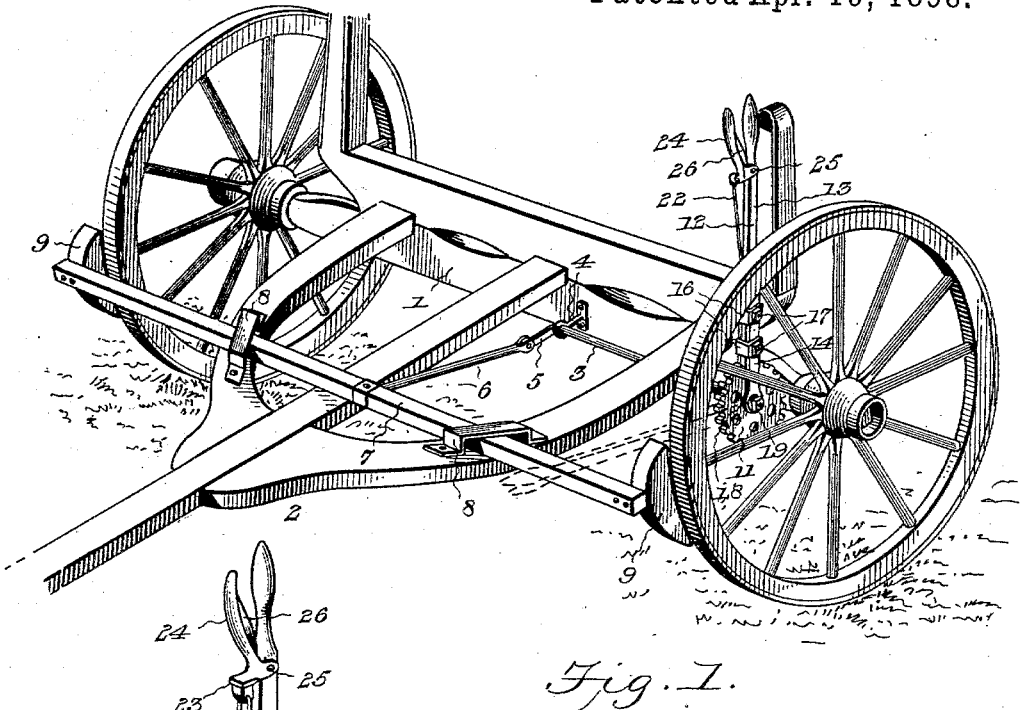
Fig. 1.
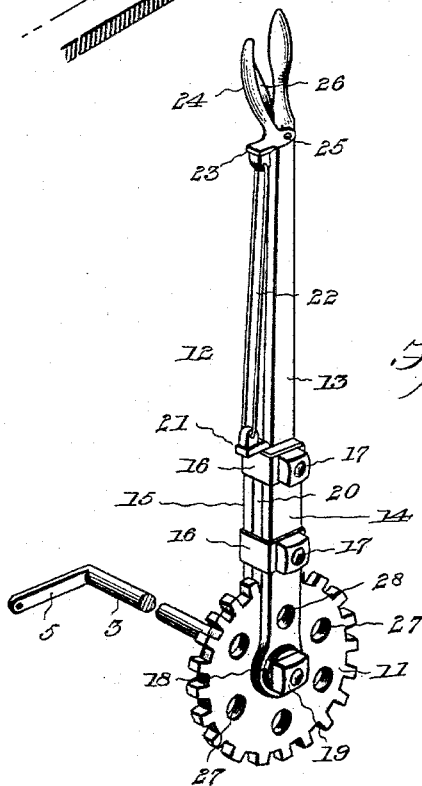
Fig. 2.
Fig. 3.
Witnesses
E. N. Monro
H. H. Bernhard
Inventor
Isaac L. Wagner
By his Attorneys,
C. A. Snow & Co.

UNITED STATES PATENT OFFICE.

ISAAC L. WAGNER, OF BUTLER, TENNESSEE, ASSIGNOR OF ONE-HALF TO D. J. FARTHING AND WILLIAM A. McQUEEN, OF SAME PLACE.

WAGON-BRAKE.

SPECIFICATION forming part of Letters Patent No. 602,786, dated April 19, 1898.

Application filed November 30, 1897. Serial No. 660,242. (No model.)

*To all whom it may concern:*

Be it known that I, ISAAC L. WAGNER, a citizen of the United States, residing at Butler, in the county of Johnson and State of Tennessee, have invented a new and useful Wagon-Brake, of which the following is a specification.

My invention relates to improvements in brakes designed to be connected to the running-gear of vehicles of that class wherein it is desirable to remove the wagon bed or box for the purpose of loading the vehicle with logs or other substances; and the primary object that I have in view is to provide an improved lever mechanism which may be adjusted by hand so as to be entirely out of the way in loading the vehicle when the body or box is removed and which lever mechanism is capable of adjustment by hand so as to compensate for the wear on the brake shoes or blocks for the purpose of bringing the parts of the brake in proper relation even when the shoes or blocks have been nearly or quite worn away.

To the accomplishment of these ends my invention consists in the novel combination of devices and in the construction and arrangement of parts, which will be hereinafter fully described and claimed.

To enable others to understand my invention, I have illustrated the preferred embodiment thereof in the accompanying drawings, forming a part of this specification, and in which—

Figure 1 is a perspective view showing my brake mechanism applied to the running-gear of a wagon, the body or box thereof being omitted. Fig. 2 is a detail perspective view of the tumbling-rod, the adjusting ratchet or wheel, and the lever, embodying my invention. Fig. 3 is a longitudinal sectional view through the parts shown by Fig. 2.

Like numerals of reference denote corresponding parts in all the figures of the drawings.

Referring to Fig. 1, the numeral 1 designates the rear axle, and 2 a part of the running-gear of an ordinary vehicle, such as is in extensive use for hauling various substances—as farm produce, logs, &c. In vehicles of this class it is often necessary to entirely remove the body or box of the vehicle and to load thereon logs and other substances, and under these conditions the brake must also be removed in case the brake mechanism or any part thereof is mounted on the body of the vehicle. To overcome this objection, I apply my improved brake mechanism entirely to the running-gear of the vehicle, and having thus attained one object that I have in view I construct the brake mechanism in a manner to permit the adjusting-lever to be moved entirely out of the way and to bring the various parts of the brake in proper operative relation, so as to compensate for the wear on the brake blocks or shoes.

3 is the tumbling rod or shaft, which is mounted in a suitable way on a part of the running-gear, such as by means of arms 4, attached to the rear axle. This tumbling rod or shaft 3 is provided with a crank or arm 5, to which is connected a link 6 on the brake beam or bar 7, and this brake-beam is confined in suitable keepers 8 on the hounds forming a part of the running-gear. Suitable blocks or shoes 9 are attached to the ends of the brake-beam in positions to bear against the wheels of the vehicle.

In connection with the described devices I employ the locking-wheel 11 and the lever 12, which is equipped with means for fastening the lever in adjustable relation to said locking-wheel and which lever is also capable of adjustment so as to be entirely out of the way when loading the vehicle.

The adjusting-wheel 11 is fastened rigidly to one end of the tumbling rod or shaft in any suitable manner, while the lever 12 is fitted loosely on the rod or shaft 3, so as to move around the adjusting-wheel freely when it is required to adjust the lever out of the way; but this lever is constructed in a peculiar way for application to the shaft 3 and the wheel and is provided with means for locking the lever in rigid relation to the wheel or disk when it is desired to adjust the rod or shaft 3 and the brake-beam. As shown more clearly by Figs. 2 and 3 of the drawings, I construct the lever 12 in three parts, so as to make it consist of the bar 13 and the plates 14 15, and these parts or members are bound or united rigidly together by means of the clips 16 and the bolts 17. The plates 14 15 are applied to opposite sides or faces of the lever so as to have their edges flush and to project beyond the end of the handle-bar 13, and in the plates are formed openings through which the rod or shaft 3 passes in order to loosely fit the lever on the rod or shaft. The lever is thus constructed to embrace the adjusting wheel or disk, and it is held in position by means of the washer 18 and the nut 19. The plates are somewhat wider than the handle-bar of the lever, and the clips and the plates are arranged and held by the bolts so as to form a longitudinal way or passage for the reception of a locking-pawl 20. This locking-pawl is a straight rod or bar slidably fitted between the plates and within the clips, and the outer end of said pawl-shaped bar or rod has an integral ear 21, to which is fitted a link 22, the other end of which link is loosely connected to an angular arm 23 on the handpiece 24. This handpiece is fulcrumed on the lever in a suitable way, as at 25, and against said handpiece and lever bears the pressure-spring 26. I preferably employ a leaf-spring having one end attached to the handpiece and bearing at its other end against the lever, as shown.

When the locking-pawl is employed in connection with the described construction of the lever, I make the wheel or disk in the form of a notched wheel or a ratchet for the pawl to engage therewith; but in lieu of the ratchet form of the disk and the pawl I may use a wheel or disk with a series of transverse apertures 27, either of which may register with openings 28 in the plates 14 15, forming a part of the lever, whereby a locking-pin 29 may be used to hold the lever in adjustable rigid relation to the wheel or disk. As shown by the drawings, I may provide the wheel or disk with the transverse apertures and with the notched or toothed periphery and employ both the pawl and the locking-pin, so that in case the spring gets out of order the insertible pin may be used as the means for holding the wheel or disk and the lever in their rigid relation to each other.

In using my brake the operator moves the lever and the wheel or disk to turn the shaft or rod 3, and thus actuate the brake-beam to apply the shoes or blocks against the wheels to retard or arrest the vehicle. The operator may walk alongside of the vehicle and hold the brake engaged with the wheels, or I may use a suitable and well-known means for locking the lever and the brake-beam in their applied positions. When it is desired to adjust the lever to compensate for the wear on the brake shoes or blocks, the pawl or pin is disengaged, the lever turned to the required position, and the lever again locked with the disk or wheel to connect said wheel and lever rigidly together. In loading the vehicle the lever may be released from the wheel or disk and turned downward either to a horizontal, an inclined, or a pendent position, so as to be entirely out of the way. The dotted lines in Fig. 1 illustrate one of the inoperative positions of the lever when it is desired to have it out of the way.

It is evident that slight changes in the form and proportion of parts and in the details of construction may be made without departing from the spirit or sacrificing the advantages of my invention.

Having thus fully described my invention, what I claim as new, and desire to secure by Letters Patent, is—

1. The combination with a rod, and a wheel or disk, of a sectional lever having its parts united together by clips which are arranged in relation to the lever members to form a guideway, a slidable pawl fitted in said guideway, and a handpiece to which the pawl is connected, substantially as described.

2. The sectional lever comprising the handle-bar, the parallel plates, the clips which embrace said plates, and the bolts for uniting the parts together, combined with a rod to which the plates are loosely fitted, a wheel or disk fast with the rod and arranged between the plates, a pawl slidably fitted between the lever-plates and within the clips, and a handpiece to which the pawl is linked, substantially as described.

3. The combination with a rear axle, the running-gear, and a brake-beam carrying shoes, of the rod journaled on said axle and linked to the brake-beam, a wheel or disk fixed to said rod at a point outside of the running-gear, a lever fitted loosely on the rod which serves as the fulcrum for the lever and the latter adapted to turn independently of the rod and the disk so as to lie in rear of the axle when not in service, and locking devices for making the lever fast with the disk or wheel at any point within the range of adjustment of the lever, substantially as described.

In testimony that I claim the foregoing as my own I have hereto affixed my signature in the presence of two witnesses.

ISAAC L. WAGNER.

Witnesses:
G. D. ATWOOD,
S. R. TRIBBET.